(12) United States Patent
Zhang et al.

(10) Patent No.: US 9,481,758 B2
(45) Date of Patent: Nov. 1, 2016

(54) POROUS POLYISOCYANURATES HAVING RIGID LINKER GROUPS

(75) Inventors: Yugen Zhang, Nanos (SG); Jackie Y. Ying, Nanos (SG); Siti Nurhanna Binte Riduan, Nanos (SG)

(73) Assignee: Agency for Science, Technology & Research, Singapore (SG)

( * ) Notice: Subject to any disclaimer, the term of this patent is extended or adjusted under 35 U.S.C. 154(b) by 82 days.

(21) Appl. No.: 12/988,246

(22) PCT Filed: Apr. 9, 2009

(86) PCT No.: PCT/SG2009/000134
§ 371 (c)(1),
(2), (4) Date: Feb. 8, 2011

(87) PCT Pub. No.: WO2009/131546
PCT Pub. Date: Oct. 29, 2009

(65) Prior Publication Data
US 2011/0124755 A1    May 26, 2011

Related U.S. Application Data

(60) Provisional application No. 61/071,206, filed on Apr. 17, 2008.

(51) Int. Cl.
| | |
|---|---|
| *C08G 18/02* | (2006.01) |
| *C08G 18/76* | (2006.01) |
| *C08G 18/77* | (2006.01) |
| *B01J 31/06* | (2006.01) |
| *B01J 35/10* | (2006.01) |
| *B01J 23/42* | (2006.01) |
| *B01J 23/44* | (2006.01) |
| *C08G 18/71* | (2006.01) |

(52) U.S. Cl.
CPC ............. *C08G 18/022* (2013.01); *B01J 23/42* (2013.01); *B01J 23/44* (2013.01); *B01J 31/063* (2013.01); *B01J 35/10* (2013.01); *C08G 18/71* (2013.01); *C08G 18/76* (2013.01); *C08G 18/7614* (2013.01); *C08G 18/7671* (2013.01); *C08G 18/77* (2013.01)

(58) Field of Classification Search
CPC ........... C08G 18/022; C08G 18/7614; C08G 18/7671; C08G 18/76; B01J 31/063; B01J 35/10; B01J 23/42; B01J 23/44

USPC ............. 524/785, 430, 431, 435, 439, 440; 528/44, 48; 502/159, 167, 338, 339, 502/402, 439; 521/123, 155, 902
See application file for complete search history.

(56) References Cited

U.S. PATENT DOCUMENTS

| | | | |
|---|---|---|---|
| 3,144,452 A * | 8/1964 | Wild et al. ................... 544/193 |
| 3,211,704 A | 10/1965 | Gilman et al. | |
| 4,359,550 A | 11/1982 | Narayan et al. | |
| 4,696,991 A | 9/1987 | Kobayashi et al. | |
| 4,983,655 A | 1/1991 | Nakata et al. | |
| 5,204,391 A | 4/1993 | Nakata et al. | |
| 5,221,743 A * | 6/1993 | Goldstein et al. ............ 544/193 |
| 2004/0037770 A1 * | 2/2004 | Fischer et al. ................ 423/584 |

FOREIGN PATENT DOCUMENTS

| | | |
|---|---|---|
| DE | 3 240 613 A1 | 5/1984 |
| FR | 2 536 403 A1 | 5/1984 |
| JP | 2001-98042 A | 4/2001 |
| SU | 787422 A1 | 12/1980 |
| WO | 2005/113626 | 12/2005 |

OTHER PUBLICATIONS

Duong et al.; N-Heterocyclic Carbenes as Highly Efficient Catalysts for the Cyclotrimerization of Isocyanates; Organic Letters, 2004, vol. 6, No. 25; Nov. 12, 2004; pp. 4679-4681.*
Duong et al., "N-Heterocyclic Carbenes as Highly Efficient Catalysts for the Cyclotrimerization of Isocyanates", Org. Lett., 2004, vol. 6, 4679-4681.
Lee, O-J et al., "Determination of mesopore size of aerogels from thermal conductivity measurements," Journal of Non-Crystalline Solids, North-Holland Physics Publishing, Amsterdam, NL, vol. 298, No. 2-3, Mar. 1, 2002, pp. 287-292.
Cote, A.P. et al., "Porous, crystalline, covalent organic frameworks," Science, American Association for the Advancement of Science, US, vol. 310, No. 5751, Nov. 18, 2005, pp. 1166-1170.
European Application No. EP 09735777 search report dated Jun. 16, 2014.

* cited by examiner

*Primary Examiner* — Rabon Sergent
(74) *Attorney, Agent, or Firm* — McDonnell Boehnen Hulbert & Berghoff LPP

(57) ABSTRACT

The invention relates to a polyisocyanurate comprising isocyanurate rings linked by linker groups coupled to the nitrogen atoms of said rings. The polyisocyanurate may be microporous or mesoporous or both microporous and mesoporous.

6 Claims, 7 Drawing Sheets

POROUS POLYISOCYANURATES HAVING RIGID LINKER GROUPS

This application is a US national phase of International Application No. PCT/SG2009/000134 filed on Apr. 9, 2009, which claims the benefit of U.S. Provisional Application No. 61/071,206 filed on Apr. 17, 2008, the disclosures of which are incorporated herein by reference in their entirety.

TECHNICAL FIELD

The present invention relates to polyisocyanurates and to methods for making them.

BACKGROUND OF THE INVENTION

Microporous and mesoporous materials, such as zeolites, activated carbon, silica and metal organic frameworks (MOFs) are widely used in heterogeneous catalysis, gas storage, adsorption and separations. It is hoped that recent development of polymer-based microporous materials may provide new opportunities in hydrogen storage and heterogeneous catalysis, since organic materials have certain advantages over other materials. Microporous polymeric materials may have unique surface properties that can be tailored to facilitate chemoselective adsorption, separation and catalysis. Although hard and soft templates have been widely used in the preparation of porous materials, a bottom-up approach allows for the synthesis of porous materials with tailored porous structure and surface chemistry. However, robust microporous and mesoporous polymers synthesized from molecular building blocks are still rather limited. Recently, polymers with intrinsic microporosity (PIMs) have been prepared entirely of fused-ring subunits to provide a rigid nonplanar block or a spiro-center for the contortion of macromolecular structure with the inefficient space packing model. Hypercrosslinked polymers represent another class of predominantly microporous polymers. Similar to PIMs, the porosity of hypercrosslinked material is a result of extensive crosslinking that make polymer chains pack inefficiently and prevent the formation of dense and non-porous systems. Generally, the porosity of these two types of materials is created by incorporating rigid units in the polymer network. Yaghi's group developed covalent organic frameworks (COFs) that are composed fully of rigid network without any "soft" knots (A. P. Cote, A. I. Benin, N. W. Ockwig, M. O'Keefe, A. J. Matzger, O. M. Yaghi, Science 2005, 310, 1166; H. M. El-Kaderi, J. R. Hunt, J. L. Mendoza-Cortes, A. P. Cote, R. E. Taylor, M. O'Keefe, O. M. Yaghi, Science 2007, 316, 268). These novel materials are constructed by dehydration condensation reaction of boronic acids. Due to the kinetic reversibility and quasi-inorganic nature of the reaction, highly crystalline products are attained.

There is a need for a polymer having intrinsic microporosity which is relatively simple to synthesise and is made from relatively readily available starting materials. It would be preferred if the microporosity were controllable.

OBJECT OF THE INVENTION

It is the object of the present invention to at least partially satisfy the above need.

SUMMARY OF THE INVENTION

In a first aspect of the invention there is provided a polyisocyanurate comprising isocyanurate rings linked by linker groups coupled to the nitrogen atoms of said rings.

The following options may be used in conjunction with the first aspect either individually or in any suitable combination.

The linker groups may be rigid. They may be aromatic or heteroaromatic or both. They may for example be either optionally substituted 1,4-phenylene groups or optionally substituted 4,4'-biphenyl groups.

The polyisocyanurate may be microporous or mesoporous or both microporous and mesoporous. It may have pores of about 1 to about 5 nm in diameter. These may be defined by the isocyanurate rings and the linker groups. The polyisocyanurate may have pores of about 20 to about 200 nm in mean diameter.

The polyisocyanurate may comprise a metal species on the walls of the pores and/or as nanoparticles located in the pores. The metal species may be catalytic. It may be a metal or a metal oxide. The metal may for example be platinum or palladium. The metal oxide may be iron oxide.

In an embodiment there is provided a polyisocyanurate having pores of about 1 to about 5 nm in diameter, said polyisocyanurate comprising isocyanurate rings linked by rigid linker groups coupled to the nitrogen atoms of said rings.

In another embodiment there is provided a polyisocyanurate having pores of about 1 to about 5 nm in diameter, said, polyisocyanurate comprising isocyanurate rings linked by optionally substituted 1,4-phenylene groups or optionally substituted 4,4'-biphenyl groups coupled to the nitrogen atoms of said rings.

In another embodiment there is provided a polyisocyanurate having pores of about 1 to about 5 nm in diameter, said polyisocyanurate comprising isocyanurate rings linked by optionally substituted 1,4-phenylene groups or optionally substituted 4,4'-biphenyl groups coupled to the nitrogen atoms of said rings, said polyisocyanurate comprising a catalytic metal or metal oxide on the walls of the pores and/or as nanoparticles located in the pores.

In a second aspect of the invention there is provided a process for making a polyisocyanurate, said process comprising exposing a bisisocyanate to an N-heterocyclic carbene (NHC) for sufficient time and at sufficient temperature for conversion of the bisisocyanate to the polyisocyanurate.

The following options may be used in conjunction with the second aspect either individually or in any suitable combination.

The polyisocyanurate may be microporous or mesoporous or both microporous and mesoporous The sufficient temperature may be from about 25 to about 150° C. The sufficient time may be from about 1 hour to about 5 days.

The NHC may be used in a catalytic amount.

The process may comprise the step of generating the NHC. It may comprise generating the NHC in situ. The step of generating the NHC may comprise treating an imidazolium salt with a base.

The bisisocyanate may be a rigid bisisocyanate. It may be an aromatic or heteroaromatic bisisocyanate. It may be for example a 1,4-phenylene diisocyanate or a 4,4'-biphenyldiisocyanate, each being optionally substituted in addition to the isocyanate groups.

The NHC may be selected from the group consisting of 1,3-bis-mestyl-4,5-dihydroimidazol-2-ylidene, 1,3-bis-(2,6-di-i-propylphenyl)-4,5-dihydroimidazol-2-ylidene and 1,3-bis-t-butyl-4,5-dihydroimidazol-2-ylidene. The NHC may be a stable NHC. It may be a polymeric NHC. It may be a non-polymeric (e.g. monomeric or dimeric) NHC.

In an embodiment there is provided a process for making a polyisocyanurate, said process comprising exposing a 1,4-phenylene diisocyanate or a 4,4'-biphenyldiisocyanate, each being optionally substituted in addition to the isocyanate groups, to an N-heterocyclic carbene (NHC) at about 25 to about 150° C. for sufficient time for conversion of the bisisocyanate to the polyisocyanurate.

In another embodiment there is provided a process for making a polyisocyanurate comprising:
- treating an imidazolium salt with a base to generate an NHC; and
- exposing a 1,4-phenylene diisocyanate or a 4,4'-biphenyldiisocyanate, each being optionally substituted in addition to the isocyanate groups, to the NHC at about 25 to about 150° C. for sufficient time for conversion of the bisisocyanate to the polyisocyanurate.

In a third aspect of the invention there is provided use of the polyisocyanurate of the first aspect for storage of a gas. The gas may be hydrogen. There is also provided a method of storing a gas comprising exposing a polyisocyanurate according to the invention to the gas, wherein the polyisocyanurate has a pore size such that it can store said gas. There is also provided a method for scrubbing a gaseous substance from a gas comprising said gaseous substance, said process comprising exposing a polyisocyanurate according to the invention to said gas, wherein the polyisocyanurate has a pore size such that it can store said gaseous substance. The polyisocyanurate may have a pore size such that it can not store other components of the gas.

In a fourth aspect of the invention there is provided a gas storage device comprising the isocyanurate of the first aspect.

In a fifth aspect of the invention there is provided use of the polyisocyanurate of the first aspect as a catalyst wherein the polyisocyanurate comprises a catalytic metal species on the walls of the pores and/or as nanoparticles located in the pores.

In a sixth aspect of the invention there is provided a method for conducting a reaction of a starting material to a product, said method comprising exposing said starting material to a polyisocyanurate according to the first aspect, wherein the polyisocyanurate comprises a catalytic metal species on the walls of the pores and/or as nanoparticles located in the pores and wherein said catalytic metal species is capable of catalysing said reaction. In an example, the starting material is an aryl halide or a vinyl halide and the reaction is a Suzuki coupling reaction. In this example the step of exposing the starting material to the polyisocyanurate comprises exposing the starting material to the polyisocyanurate in the presence of an arylboronic acid or a vinylboronic acid.

BRIEF DESCRIPTION OF THE DRAWINGS

Preferred embodiments of the present invention will now be described, by way of an example only, with reference to the accompanying drawings wherein.

DETAILED DESCRIPTION OF THE PREFERRED EMBODIMENTS

Figure 1:
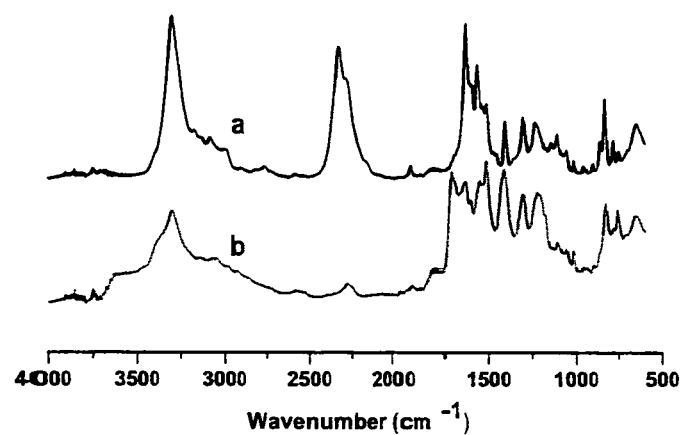
FIG. 1 shows PA-FTIR spectra of (a) A and (b) PICU-A.

The present invention provides a polyisocyanurate. The polyisocyanurate may be porous. It may be microporous or it may be mesoporous or it may be both microporous and mesoporous. It may be macroporous. It may be nanoporous. It may have pores of about 1 to about 5 nm in diameter or about 1 to 3, 2 to 5 or 2 to 4 nm in diameter, e.g. about 1, 1.5, 2, 2.5, 3, 3.5, 4, 4.5 or 5 nm in diameter. The polyisocyanurate may have a narrow pore size distribution. The pores of the polyisocyanurate may be substantially monodispersed (i.e. all of the pores may be the same diameter). It may have a bimodal pore size distribution or a polymodal pore size distribution. In such a distribution, the pores of about 1 to about 5 nm in diameter may be the smaller (or smallest) of the two modes. The smaller (smallest) mode may be substantially monodispersed, the polyisocyanate may additionally or alternatively comprise pores having a mean diameter between about 20 and about 200 nm. These pores may represent the larger of the two modes of a bimodal distribution. These pores may be about 20 to 150 nm, or about 20 to 100, 20 to 50, 50 to 200, 100 to 200, 50 to 100 or 100 to 150 nm in mean diameter, e.g. about 20, 30, 40, 50, 60, 70, 80, 90, 100, 110, 120, 130, 140, 150, 160, 170, 180, 190 or 200 nm. They may have a broad pore size distribution. The pores in the range of about 1 to about 5 nm may be a direct consequence of the chemistry of the polyisocyanate, in particular the size (length, diameter) of linker groups between the isocyanurate groups. The larger pores may be a consequence of the process used for making the polyisocyanurate.

The polyisocyanurate may be particulate. The particles of the polyisocyanurate may be approximately spherical, or they may be irregular, polyhedral or some other shape. They may have a diameter (or mean diameter) of about 0.2 to about 2 micron, or about 0.2 to 1, 0.2 to 0.5, 0.5 to 2, 1 to 2 or 0.5 to 1 micron, e.g. about 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 microns. They may be substantially monodispersed. They may be polydispersed. The polyisocyanurate may be a condensed mass. It may be a porous mass. The porous mass may have pores of about 20 to about 200 nm in diameter, or about 20 to 100, 20 to 50, 50 to 200, 100 to 200 or 50 to 100 nm, e.g. about 20, 30, 40, 50, 60, 708, 90, 100, 110, 120, 130, 140, 150, 160, 170, 180, 190 or 200 nm. They may have a broad size distribution.

The polyisocyanurate may comprise isocyanurate rings linked by linker groups. An isocyanurate ring is a 6-membered ring in which nitrogen atoms alternate with carbon atoms of carbonyl groups. The nitrogen atoms may be coupled to various species, in the present instance the linker groups. Isocyanurates may be viewed as cyclic trimers of isocyanates. The polyisocyanurate of the present invention may comprise a network of fused macrocycles, each of said macrocycles comprising three isocyanurate rings, each pair of isocyanurate rings being joined by a linker group. In this structure, the macrocycles may define pores in said polyisocyanurate. The linker groups may be coupled to the nitrogen atoms of said rings. The linker groups may be rigid. The linker groups may be aromatic or heteroaromatic or both. It may be a rigid aliphatic linker. It may be a rigid alicyclic linker. Suitable linker groups include linear fused aromatic rings (optionally substituted in addition to the isocyanurate rings), commonly having the two linkages to the isocyanurate rings diagonally opposite one another (e.g. naphthalene-2,6-diyl, anthracene-2,6-diyl etc.). Other suitable linker groups include 1,4-linked chains of aromatic rings (e.g. 1, 2, 3, 4 or 5 aromatic rings) in which each non-terminal aromatic ring is linked to adjacent rings by the carbon atoms in the 1 and 4 positions, and each terminal aromatic ring is linked to an isocyanurate ring by the carbon atom in the 4 position. Examples of such a linker are a biphenyl-4,4'-yl group and a 1,4-diphenylbenzene-4',4''-yl group (i.e. a p-terphenyl with bonds in the 4 positions of both terminal rings). The linker groups may be either optionally substituted 1,4-phenylene groups or optionally substituted 4,4'-biphenyl groups. The linker groups of the polyisocyanurate may be the same as the group joining the two isocyanate groups in the bisisocyanate used to make the polyisocyanurate, or may be derived therefrom. The size of the pores in the polyisocyanurate may be controllable. It may be controllable by means of the linker group. Thus in general, a longer linker group (i.e. a larger distance between the two isocyanate groups of the bisisocyanate) will result in larger pores in the polyisocyanurate. This may be modulated by side groups on the linker group, which may protrude into the pores, thereby either reducing their size or modifying their surface chemistry or both.

The polyisocyanurate may comprise a metal species, e.g. a metal or a metal oxide or some other metal salt on the walls of the pores. It may comprise nanoparticles of the metal species located in the pores. It may comprise the metal species both on the walls of the pores and as nanoparticles located in the pores. The metal species may be catalytic. The metal may for example be platinum or palladium or gold or iron. The metal oxide may be an oxide of any one of these, e.g. $Fe_3O_4$.

The polyisocyanurates of the present invention may be made by exposing a bisisocyanate to a N-heterocyclic carbene (NHC) for sufficient time and at sufficient temperature for conversion of the bisisocyanate to the polyisocyanurate.

The reaction may be conducted at about 25 to about 150° C., or about 25 to 100, 25 to 50, 50 to 150, 100 to 150 or 50 to 100° C., or about 25, 30, 35, 40, 45, 50, 60, 70, 80, 90, 100, 110, 120, 130, 140 or 150° C. It may take from about 1 hour to about 5 days, depending on the temperature and the nature of the bisisocyanate and NHC, or about 1 hour to about 1 day, 1 to 12 hours, 1 to 3 hours, 6 hours to 5 days, 1 to 5 days, 3 to 5 days, 12 hours to 2 days or 12 to 24 hours, e.g. about 1, 2, 3, 4, 5, 6, 12 or 18 hours, or about 1, 2, 3, 4 or 5 days. It may be conducted under an inert atmosphere, e.g. nitrogen, helium, neon, argon or a mixture of any two or more thereof. It may be conducted under anhydrous conditions. The reaction may be conducted in a sealed vessel. Thus, after combining the reagents, the vessel in which they are combined may be sealed (or they may be transferred to a separate vessel which is subsequently sealed).

It may be conducted in a solvent. The solvent may be substantially anhydrous. It may be dried prior to use in the reaction. It may be a solvent capable of dissolving one or more, optionally all, of the reagents used. It may be a solvent in which the polyisocyanurate is substantially insoluble, or from which the polyisocyanurate can precipitate. It may be an aprotic solvent. It may be a polar solvent. It may be a dipolar aprotic solvent. It may for example be dimethylsulfoxide, dimethylformamide, hexamethylphosphoric triamide, hexamethylphosphorous triamide, propylene carbonate, ethylene carbonate or a mixture of any two or more of these. The reaction may be conducted under substantially anhydrous conditions.

The bisisocyanate may be a rigid isocyanate. It may have a rigid molecular framework joining the two isocyanate groups. It may have no flexible moieties between the isocyanate groups. It may have a structure such that the two isocyanate groups of the bisisocyanate have a fixed orientation relative to each other. It may be an aromatic, fused aromatic or heteroaromatic bisisocyanate, e.g. a pyridine diisocyanate, a furan diisocyanate, a phenylene diisocyanate, a naphthalene diisocyanate or a biphenyldiisocyanate, each being optionally substituted in addition to the isocyanate groups. It may be a bisisocyanate in which the two isocyanate groups are disposed along a common axis. Thus for example it may be a 1,4-phenylene diisocyanate, a 4,4'-biphenyldiisocyanate, a 2,6-naphthalene diisocyanate or a 2,5-pyridinediisocyanate. The pore size of the polyisocyanate may be at least in part controlled by the nature of the bisisocyanate, for example by the distance between the two isocyanate groups thereof. The bisisocyanate may optionally be substituted additionally to the isocyanate groups. The substituent(s) may for example be halides (e.g. F, Cl, Br) or alkoxy (e.g. methoxy, ethoxy) groups or some other groups. The bisisocyanate may have more than one of these as substituents. Other monomers, such as 4,4'-methylenebis (phenyl isocyanate) and tolylene-2,5-diisocyanate were found to produce non-porous polymer products. The bisisocyanate may comprise two isocyanate groups joined to a linker group. The linker group may be as described earlier for the polyisocyanurate, or may be derived therefrom.

The NHC may be an imidazolylidene. It may be a 2-imidazolylidene. It may be a 1,3-disubstituted 2-imidazolylidene. It may be a dihydroimidazolylidene. It may be a 4,5-dihydroimidazolylidene. It may be a 4,5-dihydroimidazol-2-ylidene. It may be a 1,3-disubstituted 4,5-dihydroimidazol-2-ylidene. The 1 and 3 substituents (of either the 2-imidazolylidene or the 4,5-dihydroimidazol-2-ylidene) may be the same. They may be different. They may be bulky substituents. The NHC may be sterically stabilised. The substituents may be branched chain alkyl substituents. They may be C3 to C12 branched chain alkyl substituents, e.g. C3 to C6, C6 to C12 or C4 to C8. Suitable substituents include isopropyl, tert-butyl, 1,1-dimethylpropyl and 1,1,2,2-tetramethylpropyl. They substituents may be aromatic. They may be 2,6-disubstituted aromatic. They may be for example 2,6-dimethylphenyl or 2,4,6-trimethylphenyl.

The NHC may be a stable NHC. It may be a polymeric NHC. In this case the NHC may be recycled for subsequent reactions. It may be a soluble NHC. It may be an NHC that is separable from the polyisocyanurate. It may be a monomeric NHC. It may be a dimeric NHC.

The NHC may be used in a catalytic amount. It lazy be used in a molar amount relative to the bisisocyanate of about 1 to about 10%, or about 1 to 5, 1 to 2, 2 to 10, 5 to 10 or 2 to 5%, e.g. about 1, 2, 3, 4, 5, 6, 7, 8, 9 or 10%.

The reaction may comprise the step of generating the NHC. The NEC may be generated in situ. This may be useful in cases where the NHC has limited stability, or is unstable. It may be useful in cases where the NHC has limited stability, or is unstable, under the reaction conditions used for making the polyisocyanurate. The NHC may be made immediately, or a short time, prior to combining it with the bisisocyanate. The reaction may be conducted without isolation, or without purification, of the MHC. Thus the NHC may be generated and the bisisocyanate added directly to the reaction mixture in order to convert the bisisocyanate to the polyisocyanurate.

The NHC may be generated by exposure of an imidazolium salt to a base. The base may be a strong base. It may be a non-nucleophilic base. It may for example be hydride (e.g. sodium hydride), lithium diisopropylamide, tert-butoxide (e.g. potassium tert-butoxide) or some other suitable base. The base may be used in about equimolar amount relative to the NHC, or may be used in a slight molar excess, e.g. less than or about 1, 5, 10, 15 or 20% molar excess. The reaction may be conducted in a solvent. The same range of solvents may be used as described above for the conversion of the bisisocyanate to the polyisocyanurate. The reaction may be conducted at about 0 to about 30° C. or about 0 to 25, 0 to 20, 0 to 15, 0 to 10, 10 to 30, 20 to 30, 10 to 20 or 15 to 25° C., e.g. about 0, 5, 10, 15, 20, 25 or 30° C. It may be conducted for at least about 30 minutes, or at least about 1, 1.5 or 2 hours, or for about 0.5 to about 5 hours, or about 0.5 to 2, 0.5 to 1, 1 to 5, 2 to 5 or 1 to 3 hours, e.g. about 0.5, 1, 1.5, 2, 2.5, 3, 3.5, 4, 4.5 or 5 hours. It may be conducted under the same range of atmospheres as described above for the conversion of the bisisocyanate to the polyisocyanurate. It may be conducted under anhydrous conditions. The solvent may be dried before use in the preparation of the NHC. The imidazolium salt may correspond to the NHC. It may be an imidazolyl salt. It may be a 2-imidazolyl salt. It may be a 1,3-disubstituted 2-imidazolyl salt. It may be a dihydroimidazolyl salt. It may be a 4,5-dihydroimidazolyl salt. It may be a 4,5-dihydroimidazol-2-yl salt. It may be a 1,3-disubstituted 4,5-dihydroimidazol-2-yl salt. The 1 and 3 substituents (of either the 2-imidazolyl salt or the 4,5-dihydroimidazol-2-yl salt) may be the same. They may be different. They may be bulky substituents. The imidazolium salt may be sterically stabilised. The substituents may be branched chain alkyl substituents. They may be C3 to C12 branched chain alkyl substituents, e.g. C3 to C6, C6 to C12 or C4 to C8. Suitable substituents include isopropyl, tert-butyl, 1,1-dimethylpropyl and 1,1,2,2-tetramethylpropyl. They substituents may be aromatic. They may be 2,6-disubstituted aromatic. They may be for example 2,6-dimethylphenyl or 2,4,6-trimethylphenyl.

During the reaction to form the polyisocyanurate, the reaction mixture may be agitated or it may be unagitated. It may be vigorously agitated or it may be gently agitated. The agitation, if used, may comprise stirring, shaking, sonicating, mixing or some other form of agitating.

As the polyisocyanurate is commonly insoluble in the solvent used in its production, it may precipitate from the reaction mixture. It may be advantageous to cool the reaction mixture following completion of the reaction. This may facilitate subsequent manipulation of the reaction mixture and may facilitate precipitation of the product polyisocyanurate. The precipitated product may be separated from the reaction mixture, e.g. by settling and decanting, by filtration, by centrifugation or by some other suitable method. It may then be washed with a wash solvent. Suitable wash solvents are non-solvents or poor solvents for the product. They may for example be any of the suitable solvents described above as being suitable for the reaction itself, or they may be some other suitable organic solvent such as methylene chloride, chloroform, diethyl ether, ethyl acetate, ethanol, methanol or a combination of any two or more of these. The product may be washed more than once, e.g. 2, 3, 4 or 5 times, and each washing may, independently, use a washing solvent as described above. For example the product may be washed successively with dimethyl formamide, dichloromethane and ether. Following the washing the product may be dried. This may be at elevated temperature (e.g. in an oven) at a temperature of about 50 to about 150° C., or about 50 to 100, 100 to 150 or 80 to 120° C. It may be conducted at reduced pressure, e.g. less than about 100 mBar, or less than about 50, 20, 10 or 1 mBar. It may be conducted in a stream of gas, e.g. air or nitrogen or carbon dioxide or a mixture of any two or more suitable gases.

The procedure described above may provide a quantitative or near quantitative yield of the polyisocyanurate based on bisisocyanate. The yield may be at least about 80%, or at least about 85, 90, 95 or 99%.

The polyisocyanurate of the present invention may be used for storage of a gas, for example hydrogen. As the pores of the polyisocyanurate may be tailored at will, specific products may be designed for storage of specific gases by adjusting the nature of the bisisocyanate used to make the polyisocyanurate. The polyisocyanurate may be used for absorbing or scrubbing one or more gases from a gas mixture. In this case the pores of the polyisocyanurate should be suitable size to fit the gas(es) to be scrubbed but not other gases in the gas mixture. In some instances a mixture of polyisocyanurates may be used to absorb more than one gas from a gas mixture. In some embodiments two or more different polyisocyanurates having different pore sizes may be used in conjunction (e.g. mixed) in order to separate more than one different gas from a mixture.

As the polyisocyanurate described herein is inherently porous at a molecular level, the volume of a gas that may be absorbed and/or stored by it is correspondingly relatively high. The polyisocyanurate may be capable of storing up to about 5% by weight of hydrogen, or up to about 4 or 3%, or about 1 to about 5%, or about 1 to 3, 3 to 5, 3 to 4 or 4 to 5% by weight, e.g. about 1, 2, 3, 3.5, 4, 4.5 or 5% by weight. The hydrogen may be stored at elevated pressure and reduced temperature. It may for example be stored at about 20 to about 100 bar, or about 50 to 100, 20 to 50 or 40 to 70 bar, e.g. about 20, 30, 40, 50, 60, 70, 80, 90 or 100 bar. It may be stored at below about 0° C., or below about 10, 20, 30, 40, 50, 60, 70, 80, 90 or 100° C., or about 0 to −100° C., or about 0 to −50, −50 to −100, −50 to −80, −80 to −100 or −70 to −80° C., e.g. about 0, −10, −20, −30, −40, −50, −60, −70, −80, −90 or −100° C. Suitable conditions may be for example 50 bar at −78° C. The gas stored in the polyisocyanurate may be released at will. This may be achieved by heating the polyisocyanurate having the gas in the pores thereof to a suitable temperature. The rate of release of the gas may be adjusted by adjusting the temperature to which the polyisocyanurate having the gas in the pores thereof is heated. Release of the gas may be achieved by replacing the gas by a second gas which has greater affinity for the polyisocyanurate to be released. It may be achieved by applying a vacuum or reduced (relative to the storage pressure) pressure to the polyisocyanurate having the gas in the pores thereof. The rate of release of the gas may be adjusted by adjusting the reduced pressure to which the polyisocyanurate having the gas in the pores thereof is exposed. The gas may be released by both raising the temperature and reducing the pressure under which the gas is stored in the polyisocyanurate. For example, a polyisocyanurate having hydrogen stored in the pores thereof at 50 bar at −78° C. may release substantially all of the hydrogen by increasing the temperature to about room temperature and/or reducing the pressure to about 1 Bar.

The polyisocyanurate may therefore be used in a gas storage device or a gas scrubbing device.

The polyisocyanurate may also be used as a catalyst. It may therefore be a catalytic polyisocyanurate. In this application the polyisocyanurate should have catalytic groups in the pores thereof. They may be attached or immobilised to the walls of the pores. They may be in the form of a catalytically active substance such as a metal species, e.g. metal, metal oxide or other metal salt, disposed in the pores. In this event the metal species may be in the form of nanoparticles. The substance may be restricted to the pores by the shape of the pores. The metal may be for example palladium or platinum or gold. The oxide may be iron oxide.

A catalytic polyisocyanurate may be made by making a polyisocyanurate, as described above, and introducing the catalytic metal species thereto. A metal species may be formed in the pores of the polyisocyanurate by precipitation or reaction. For example a palladium-loaded polyisocyanurate may be prepared by loading a soluble palladium salt (e.g. palladium acetate) into the pores of the polyisocyanurate and heating to a suitable temperature for a suitable time. A polyisocyanurate loaded with a soluble platinum salt (e.g. platinum chloride) may generate a platinum metal-loaded polyisocyanurate by reduction with a suitable reducing agent such as sodium borohydride.

Such a catalytic polyisocyanurate may be used for catalysing a reaction of a starting material to a product. The conditions of such a reaction will of course depend on the nature of the reaction. A suitable reaction which may be catalysed by a polyisocyanurate having palladium in the pores thereof is a Suzuki coupling reaction between an aryl halide and an aryl boronic acid. Typically sufficient polyisocyanurate will be used to have palladium present at about 1% of the reagent present, or about 0.5 to 2% or 1 to 2% or 0.5 to 1%. The actual amount of polyisocyanurate will depend on the loading of palladium on the polyisocyanurate. The reaction may achieve high yields of coupling product, e.g. greater than about 80%, or greater than 85, 80, 95 or 98%. The time taken to achieve this may be less than about 2 days, or less than 1 or 0.5 days, e.g. about 0.5, 1, 1.5 or 2 days. Other reactions, e.g. other coupling reactions, which utilise catalysts that may be immobilised in and/or on the pores of the polyisocyanurate may also be conducted in similar fashion. Following completion of the reaction the catalyst may be separated, e.g. by filtration, settling/decanting, centrifugation etc. It may be washed in order to remove residual materials such as solvent, product, unreacted starting material or reagent etc. It may then be reused in a subsequent reaction. Commonly there will not be a significant loss of catalytic activity on a subsequent reuse of the catalyst (e.g. less than about 10% loss, or less than about 5, 2 or 1% loss).

The present invention presents a simple protocol for the catalytic synthesis of microporous and mesoporous polyisocyanurates. These polymers possess robust microporosity and mesoporosity constructed from porous organic sheets. They have been demonstrated as catalyst supports for Pd(II) complexes, as well as for Pd or Pt metal nanoparticles.

This is the first time that polyisocyanurates have been synthesized with rigid porous network.

These novel polymeric materials are of interest for absorbent, gas storage, heterogeneous catalysis and energy applications. In particular, they may be of interest for hydrogen storage, and as catalyst supports for organometallic complexes, and metal or oxide nanoparticles.

The present invention was developed in the context of work aimed at design and synthesis of novel covalent organic frameworks with functional groups so that the porous polymer product can be designed for the desired applications. The present specification therefore describes the synthesis and application of microporous and mesoporous polyisocyanurates composed with rigid carbon and nitrogen networks. These new materials are derived by cyclotrimerization of di-isocyanates (bisisocyanates) using N-heterocyclic carbene (NHC) as catalyst. Polyisocyanurates have been widely used in enhancing the physical properties of different materials, increasing the thermal resistance, flame retardation and chemical resistance characteristics. Although macroporous polyisocyanurates with foam structure has been studied (N. Masakazu, S. Kapri, S. Hajime, JP 2005213303, 2005; I. Hideki, M. Hisashi, T. Takafumi, F. Takao, JP 2003246829, 2003), robust microporous and mesoporous polyisocyanurates have not hitherto been developed, and novel properties or applications may be expected with these novel materials.

NHCs have been widely used as organocatalysts in many important transformations. Recently, it was found that NHCs can efficiently catalyze cyclotrimerization of isocyanates to form a planar six-membered heterocyclic ring structure (H. A. Duong, M. J. Cross, J. Louie, *Org. Lett.* 2004, 6, 4679). This reaction was adapted by the present inventors to synthesize porous polymer networks by replacing simple isocyanates with diisocyanates. Scheme 1 illustrates that a porous C/N organic framework could be generated using NHC organocatalysts. When rigid aryl diisocyanates were used, rigid polymer frameworks were achieved. Several diisocyanates (A, B) were employed in this work, and various NHCs were examined in the synthesis of polyisocyanurate networks. It was found that the NHCs of 1,3-bis-mestylimidazol-2-ylidene (IMes) and 1,3-bis-(2,6-di-i-propylphenyl)imidazol-2-ylidene (IPr) did not work for this synthesis. NHCs of 1,3-bis-mestyl-4,5-dihydroimidazol-2-ylidene (SIMes) and 1,3-bis-(2,6-di-i-propylphenyl)-4,5-dihydroimidazol-2-ylidene (SIP-r) showed low activities in this reaction especially for monomers with ortho-substituents, such as B. 1,3-Bis-t-butyl-4,5-dihydroimidazol-2-ylidene (SI$^t$Bu) showed very high activities for a variety of monomers.

Scheme 1: synthesis of PICU-A and PICU-B
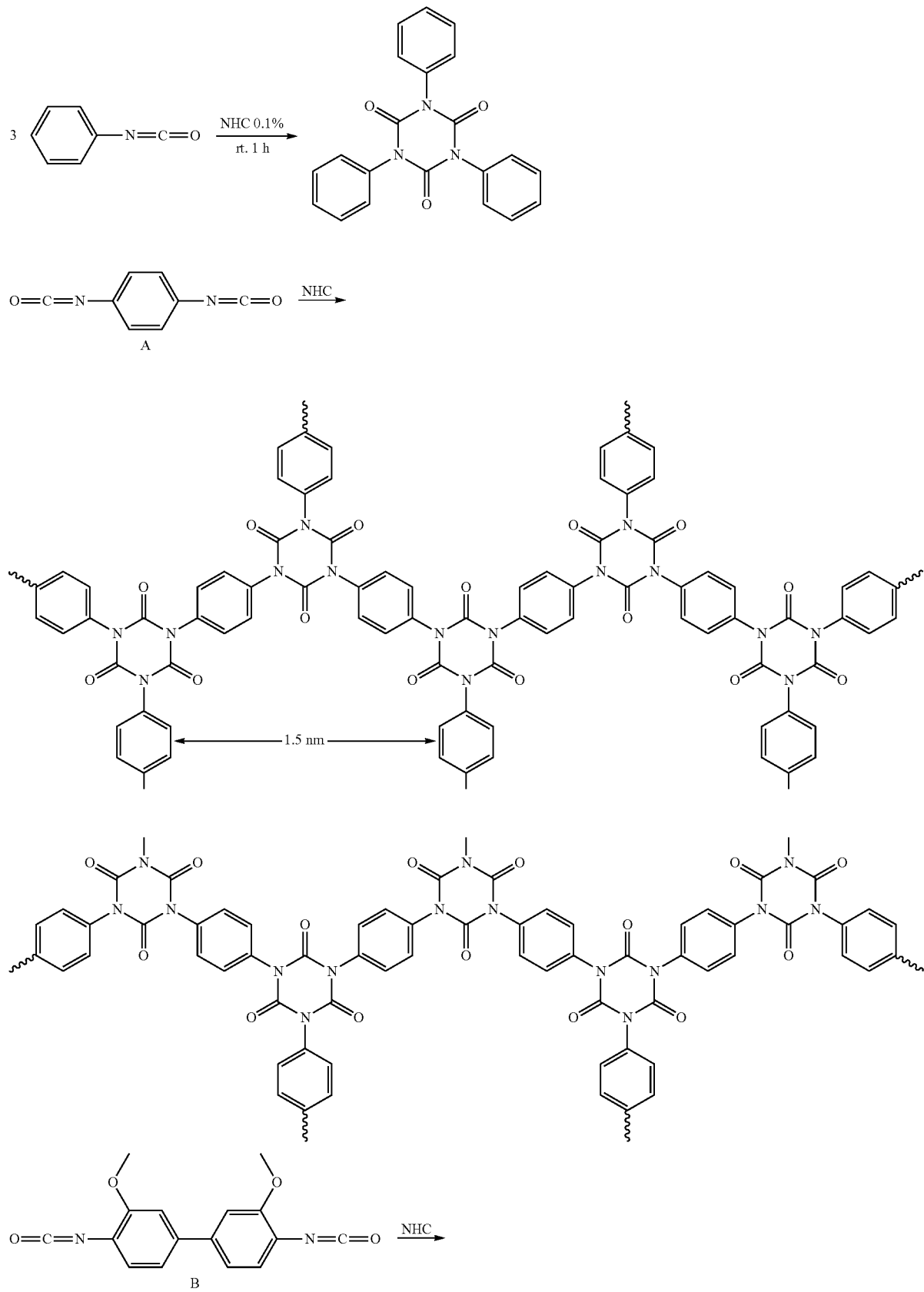

-continued

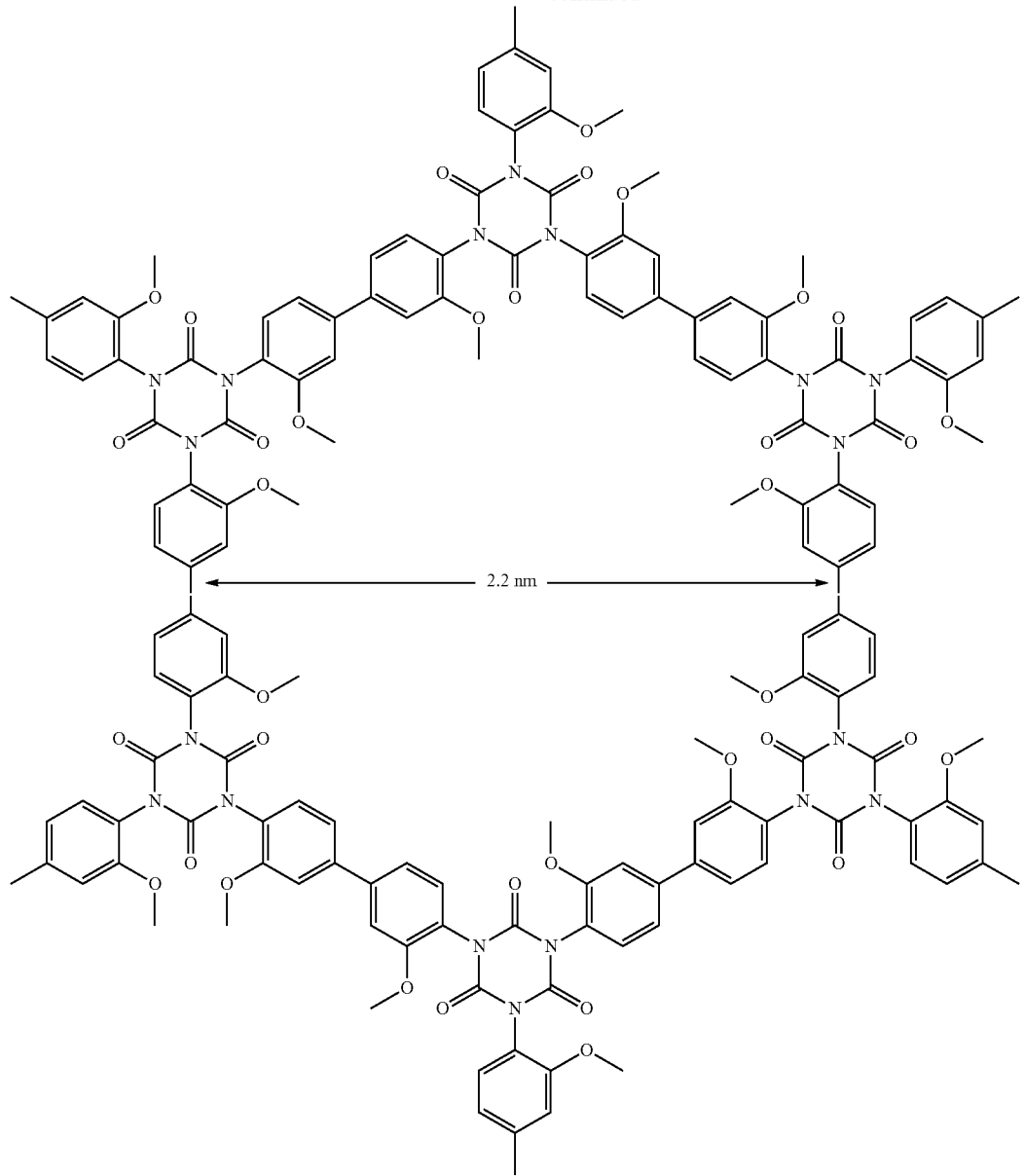

Figure 2:
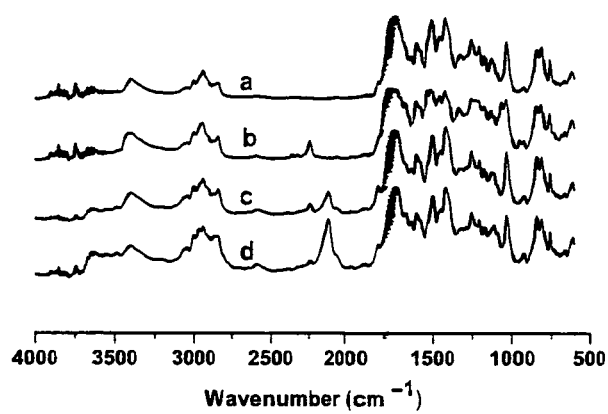
FIG. 2 shows PA-FTIR spectra of PICU-B synthesized in DMF at (a) 80° C. and (b) 25° C., (c) in DMF/tetrahydrofuran (THF) at 80° C., and (d) in DMF/toluene at 80° C.
Figure 3:
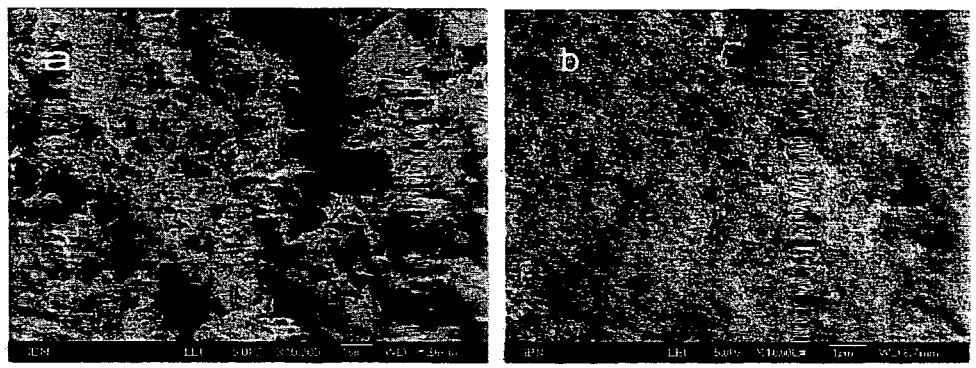
FIG. 3 shows SEM images of PICU-A synthesized under (a) static conditions and (b) stirring.
Figure 4:
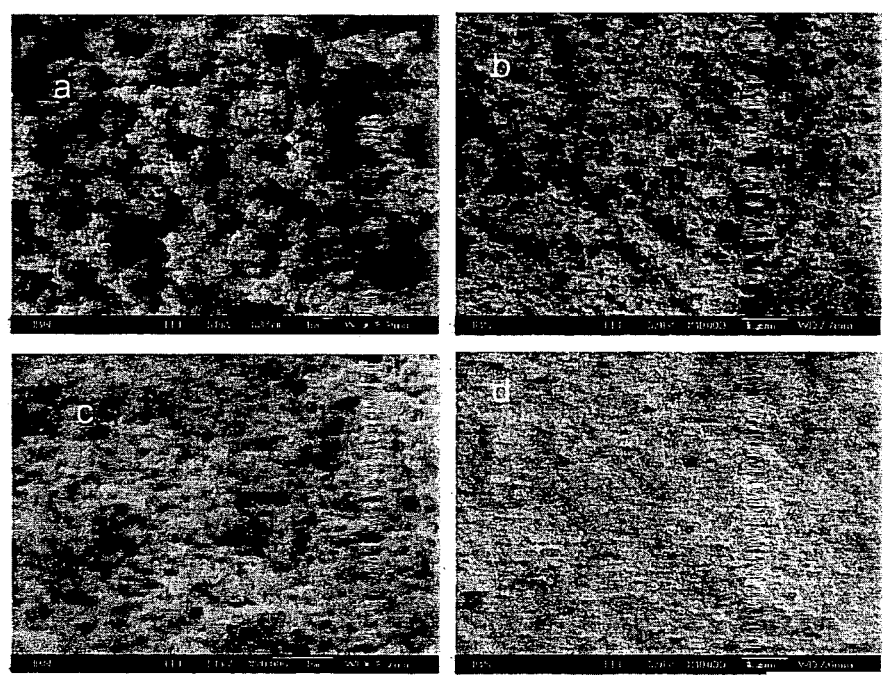
FIG. 4 shows SEM images of PICU-1 synthesized (a) in DMF/toluene at 80° C., and in DMF at (b) 80° C., (c) 150° C. and (d) 25° C.
Figure 5:
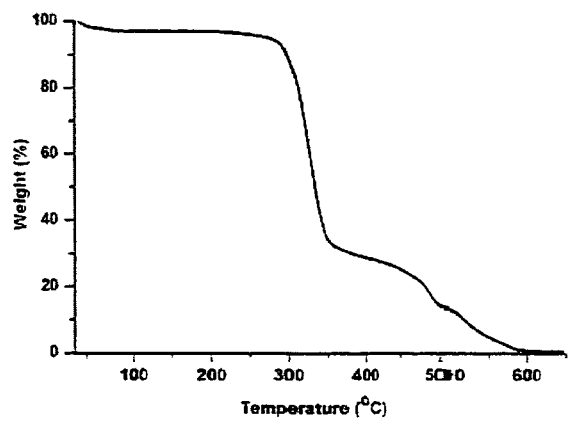
FIG. 5 is a TGA curve of PICU-B.

Typically, porous polyisocyanurate (PICU) was synthesized by dissolving 1 mmol of monomer (B) in 5 ml of N,N'-dimethylformamide (DMF) in a pressure flask, and 0.02 mmol of SI$^t$Bu NHC was added. The reaction flask was closed and heated to 80° C. for 2-4 h. The reaction could be conducted at 25° C. to 150° C.; a longer period of time would be needed for the completion of the reaction at lower temperatures. Due to the low solubility of A in common solvents, the reaction was performed with a suspension of A in hot dimethylsulfoxide (DMSO). The polymer product was collected by filtration and washing, and subsequently dried in a vacuum oven. In all syntheses, quantitative yields were obtained. Due to the low solubility of the starting materials and product, the reaction was essentially conducted under a heterogeneous condition. Unlike the conventional heterogeneous catalytic system, the NHC catalysts in this case might migrate onto the polymer network and initiate the next catalytic cycle. Photoacoustic Fourier-transform infrared (PA-FTIR) spectroscopy provided a direct method for monitoring the progress of isocyanate conversion to the polymer product. FIG. 1 shows the strong vibration peak of isocyanate of at ~2300 cm$^{-1}$. This peak disappeared in the PA-FTIR spectrum of the polymer product PICU-A, while a new peak emerged at 1700 cm$^{-1}$ due to the presence of the —NC(O)N— group. FIG. 2 illustrates the PA-FTIR spectrum of PICU-B synthesized under different conditions. The microstructure and morphology of PICU-A materials are elucidated by scanning electron microscopy (SEM) (FIG. 3). When PICU-A was synthesized under static conditions, the polymer formed a branched structure on the submicron scale. When the reaction was performed under stirring, the product showed a more aggregated and condensed structure. The morphology of PICU-B could vary from a particulate-based structure (FIG. 4(a)) to a porous network (FIG. 4(c)) or more condensed structure (FIG. 4(d)) using different reaction conditions. Thermal gravimetric analysis (TGA) indicated that the network structure of the polymers derived remained stable up to 300° C. (FIG. 5).

Figure 6:
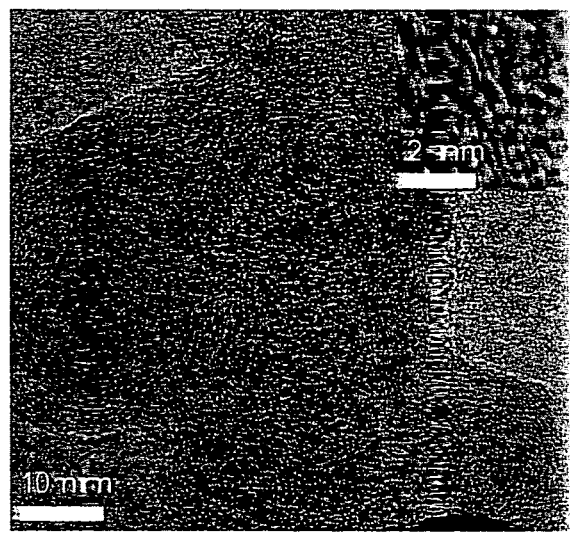
FIG. 6 is a TEM image of PICU-B.

It is widely held that due to the requirement of microscopic reversibility for crystallization, synthesis of crystalline crosslinked organic polymers would be difficult if not impossible. The inventors did not attain highly crystalline C/N framework products, but did manage to generate microcrystalline polymer networks. The significantly disordered layered structure of polyisocyanurates was illustrated by transmission electron microscopy (TEM) (FIG. 6). It is thought that the two-dimensional rigid organic sheets might only extend to limited size, and stacked in layered structures with short-range ordering. The interlayer distance of PICU-B was estimated by TEM to be about 3.57 Å. This value was slightly larger than graphite (3.35 Å), and Yaghi's COF-1 (3.33 Å) and COF-5 (3.46 Å); this might be due to the twisting between phenyl rings and C3N3 six-membered rings (M. B. Mariyatra, K. Panchanatheswaran, J. N. Low, C. Glidewell, *Acta Cryst.* 2004, C60, 682).

Figure 7:
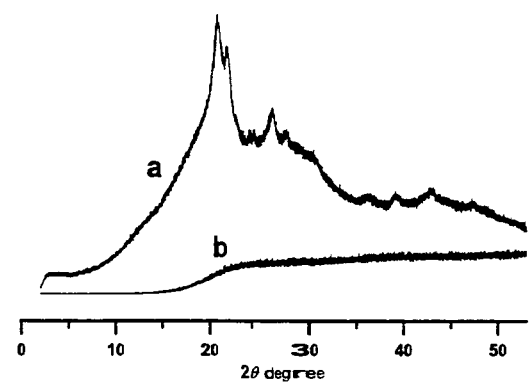
FIG. 7 shows XRD patterns of PICU-A (a) in the dry form, and (b) in DMSO.
Figure 8:
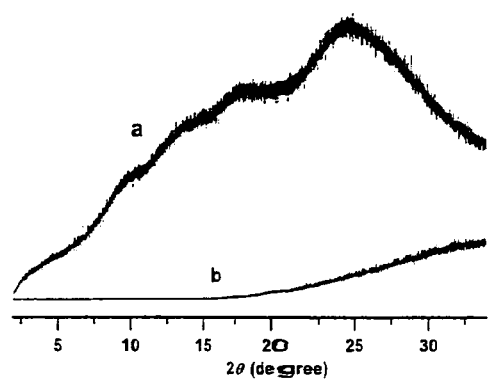
FIG. 8 shows XRD patterns of PICU-B (a) in the dry form, and (b) in DMF.

The powder X-ray diffraction (XRD) peaks or PICU samples were rather weak and broad, and difficult to index (FIGS. 7 and 8). It was interesting to note that the partially ordered nature of PICU-A and PICU-B was fully reversible. When the polymers were immersed in solvents (e.g. DMSO and DMF), the XRD peaks disappeared. Upon drying, the XRD peaks re-emerged. It is thought that polymers might have became swollen by absorbing the solvent molecules, and may thereby have lost structural order. As the solvent was removed, the packing of the two-dimensional network layer may therefore have been regained, reconstituting the original short-range order of PICU.

Figure 9:
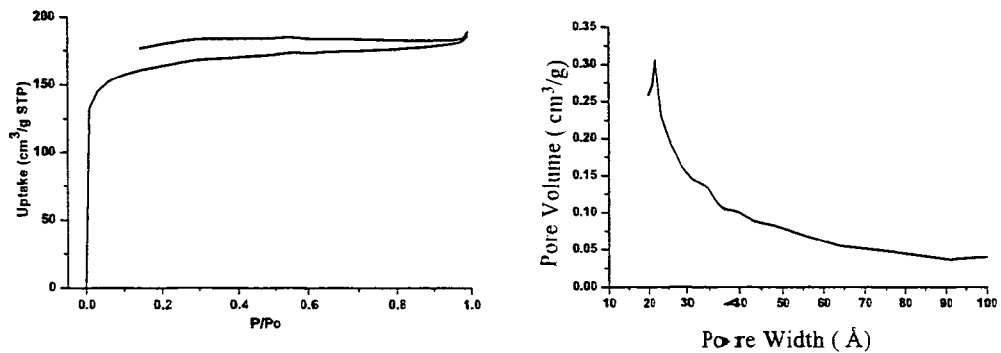
FIG. 9 is a Nitrogen adsorption-desorption isotherm and pore size distribution of PICU-B.
Figure 10:
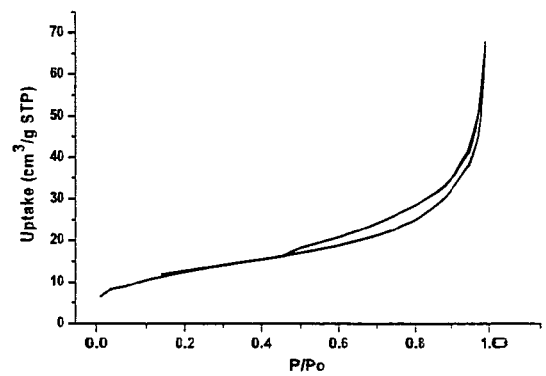
FIG. 10 is a Nitrogen adsorption-desorption isotherm of PICU-A.

The stability and porosity of PICU-A and PICU-B were confirmed by $N_2$ adsorption analysis. The as-synthesized polymers were degassed at 120° C. for 16 h, and their nitrogen adsorption isotherms were collected at 77 K. PICU-B showed an isotherm typical of a microporous material (FIG. 9). It has a Brunauer-Emmett-Teller (BET) surface area of 569 $m^2/g$ and a pore volume of 0.355 $cm^3/g$, which were much higher than many layered materials (e.g. graphite and clay), and were in the range of many microporous zeolites and carbons. However, PICU-B was less porous as compared to Yaghi's COF-5 (1590 $m^2/g$ and 0.998 $cm^3/g$) (A. P. Cote, A. I. Benin, N. W. Ockwig, M. O'Keefe, A. J. Matzger, O. M. Yaghi, *Science* 2005, 310, 1166); this could be due to its short-range order and slipped organic sheets that resulted in some inaccessible pores. PICU-A showed an even lower surface area (45 $m^2/g$) and pore volume (0.07 $cm^3/g$) (see FIG. 10 for isotherm). It was dominated by mesopores of 20-40 Å (from t-plot analysis), with an average pore diameter of 22 Å (from DFT calculations).

Figure 11:
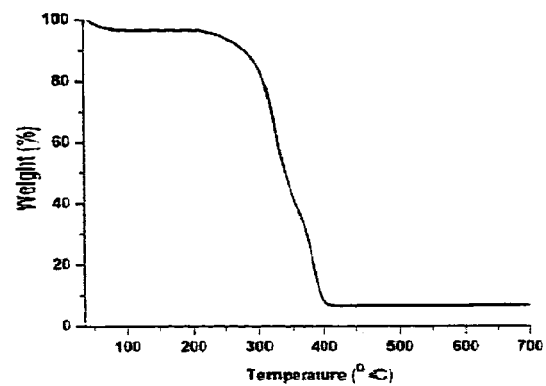
FIG. 11 is a TGA curve of Pd/PICU-B-1 with a Pd loading of 1 mmol/g.
Figure 12:
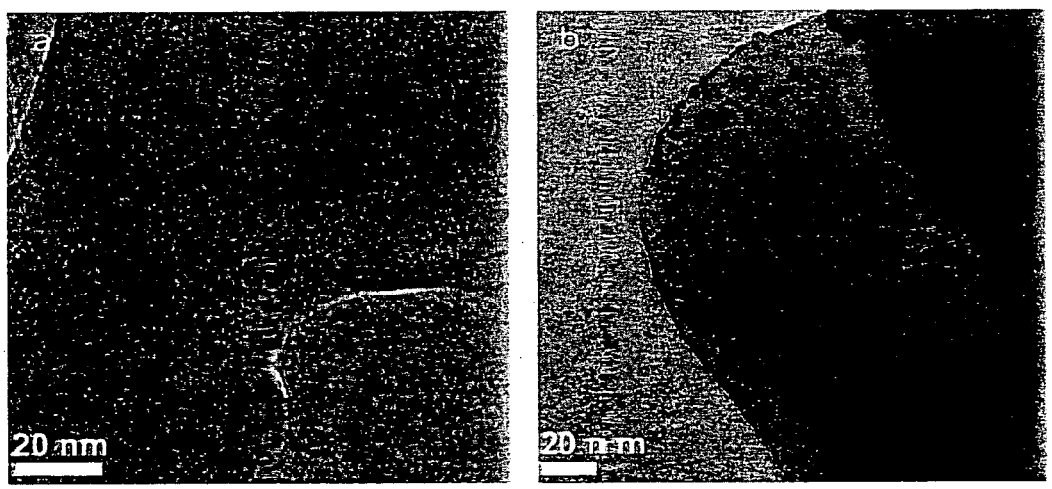
FIG. 12 shows TEM images of (a) Pd/PICU-B-1 and (b) Pd/PICU-B-2.
Figure 13:
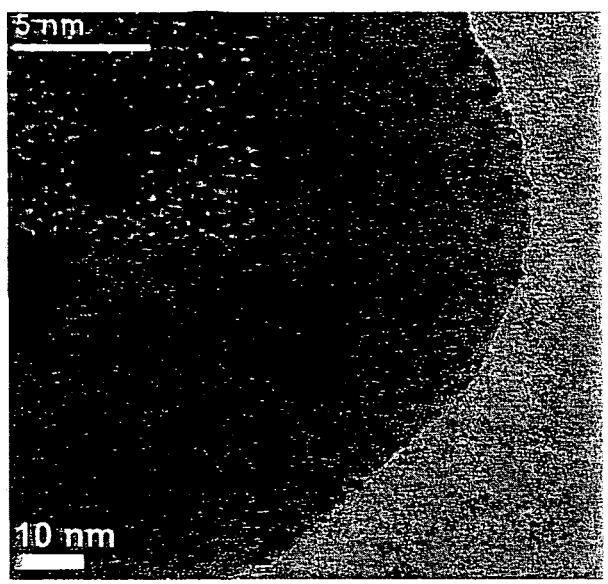
FIG. 13 is a TEM image of Pt/PICU-B.

The novel materials reported herein possessed microporous and mesoporous network structures and isocyanurate functional units. They could be targeted towards applications in hydrogen storage, adsorbents and heterogeneous catalysis. For example, PICU-B was developed as a porous support for metal complexes or metal nanoparticles. Palladium acetate and PICU-B were mixed in DMF and stirred at 80° C. overnight. A yellow powder, Pd/PICU-B-1, was obtained after filtration, washing and drying. The TGA curve of Pd/PICU-B-1 with a Pd loading of about 1 mmol/g is shown in FIG. 11. When the synthesis was performed in DMSO, a black powder, Pd/PICU-B-2 was obtained, resulting from the reduction of Pd(II) to Pd(0) nanoparticles. TEM images showed that there were no palladium particles in Pd/PICU-B-1, whereas many Pd nanoparticles of 2-3 nm were observed in Pd/PICU-B-2 (FIG. 12). Both Pd/PICU-B-1 and Pd/PICU-B-2 demonstrated good activity and reusability (see Table 1). Pt/PICU-B was also synthesized by mixing PICU-B and Pt(II) chloride in DMF 80° C., followed by reduction with sodium borohydride (FIG. 13).

TABLE 1

Suzuki coupling reaction over Pd/PICU-B.[a]

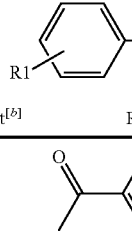

| Entry | Catalyst[b] | Reactant | Product | Temp [° C.] | Time [h] | Yield [%] |
|---|---|---|---|---|---|---|
| 1 | A | 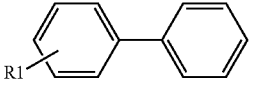 | 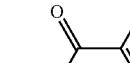 | 80 | 14 | 99 |
| 2 | A[c] | 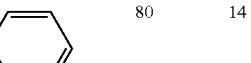 | 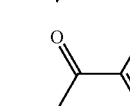 | 80 | 14 | 98 |
| 3 | B | 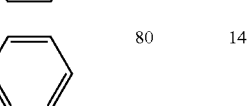 | 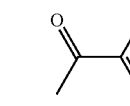 | 80 | 14 | 99 |
| 4 | B[c] | 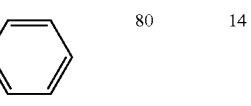 | 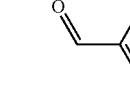 | 80 | 14 | 98 |
| 5 | B | 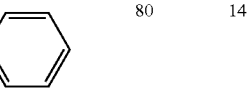 | | 80 | 14 | 99 |

TABLE 1-continued

Suzuki coupling reaction over Pd/PICU-B.[a]

| Entry | Catalyst[b] | Reactant | Product | Temp [° C.] | Time [h] | Yield [%] |
|---|---|---|---|---|---|---|
| 6 | B | 2-bromonaphthalene | 2-phenylnaphthalene | 80 | 18 | 99 |
| 7 | B | 2,6-dibromopyridine | 2,6-diphenylpyridine | 80 | 28 | 99 |
| 8 | B | 1,3,5-tribromobenzene | 1,3,5-triphenylbenzene | 80 | 18 | 12 |

[a]Typical reaction conditions: 0.5 mmol of substrates, 2 equivalents of $Cs_2CO_3$, 1.5 equivalents of $C_6H_5B(OH)_2$, in $DMF/H_2O$.
[b]A: Pd/PICU-B-1; B: Pd/PICU-B-2.
[c]Recycled catalyst.

Experimental Section

All solvents and chemicals were used as obtained from commercial suppliers, unless otherwise noted. Dry solvents and standard nitrogen glove box were used for the set up of reactions. PA-FTIR spectra were recorded on Digilab FTS 7000 FTIR spectrometer equipped with a MTEC-300 photoacoustic detector. TGA was performed on Perkin-Elmer Pyris-1 Thermogravimetric Analyzer. XRD was performed on a Philips X'Pert PRO X-ray diffractometer with CuKα radiation. SEM images were obtained on a JEOL JSM-7400F electron microscope (10 kV). TEM experiments were conducted on a FEI Tecnai $G^2$ F20 electron microscope (200 kV).

Synthesis of PICU-A.

In a glove box, A (160 mg, 1 mmol) was suspended in DMSO (20 ml) in a pressure flask, and SI$^t$Bu (0.05 mmol) was added. SI$^t$Bu was generated in situ by mixing 1,3-bis-t-butylimidazolinium chloride (0.05 mmol) with NaH (0.05 mmol) in DMF (0.5 ml) for 2 h, before transferring to the reaction flask. The reaction flask was sealed, and placed in the oven at 120° C. for 3 days. PICU-A was collected by filtration, washed with DMF, $CH_2Cl_2$ and ether, and dried in a vacuum oven. Quantitative yield of PICU-A was obtained.

Synthesis of PICU-B.

In a glove box, B (980 mg, 5 mmol) was dissolved in DMF (50 ml) in a pressure flask, and SI$^t$Bu (0.1 mmol, generated in situ) was added. The reaction flask was sealed, and placed in the oven at 80° C. for 3 days. PICU-B was collected by filtration, washed with DMF, $CH_2Cl_2$ and ether, and dried in a vacuum oven. Quantitative yield of PICU-B was obtained.

The invention claimed is:

1. A polyisocyanurate comprising isocyanurate rings linked by rigid linker groups coupled to the nitrogen atoms of said rings, said linker groups being aromatic or heteroaromatic or both and said polyisocyanurate being microporous or mesoporous or both microporous and mesoporous, additionally comprising a metal species on the walls of the pores and/or as nanoparticles located in the pores wherein the metal species is catalytic for a Suzuki coupling reaction.

2. The polyisocyanurate of claim 1 wherein the linker groups are either optionally substituted 1,4-phenylene groups or optionally substituted 4,4'-biphenyl groups.

3. The polyisocyanurate of claim 1 having pores of about 1 to about 5 nm in diameter.

4. The polyisocyanurate of claim 1 having pores of about 20 to about 200 nm in mean diameter.

5. The polyisocyanurate of claim 1 wherein the metal species is a metal and the metal is platinum or palladium.

6. A method for conducting a Suzuki coupling reaction of a starting material to a product, wherein the starting material is an aryl halide or a vinyl halide, said method comprising exposing said starting material to a polyisocyanurate according to claim 1 in the presence of an arylboronic acid or a vinylboronic acid, wherein said metal species is capable of catalysing said Suzuki coupling reaction.

* * * * *